US012400238B2

(12) United States Patent
Copeland

(10) Patent No.: US 12,400,238 B2
(45) Date of Patent: Aug. 26, 2025

(54) MOBILE INTELLIGENT OUTSIDE SALES ASSISTANT

(71) Applicant: Accenture Global Solutions Limited, Dublin (IE)

(72) Inventor: Shannon Copeland, Atlanta, GA (US)

(73) Assignee: Accenture Global Solutions Limited, Dublin (IE)

( * ) Notice: Subject to any disclaimer, the term of this patent is extended or adjusted under 35 U.S.C. 154(b) by 128 days.

(21) Appl. No.: 17/883,402

(22) Filed: Aug. 8, 2022

(65) Prior Publication Data
US 2023/0048077 A1    Feb. 16, 2023

Related U.S. Application Data

(60) Provisional application No. 63/260,106, filed on Aug. 9, 2021.

(51) Int. Cl.
*H04M 3/51* (2006.01)
*G06Q 30/0201* (2023.01)
*G10L 15/19* (2013.01)
*G10L 15/26* (2006.01)

(52) U.S. Cl.
CPC .......... *G06Q 30/0201* (2013.01); *G10L 15/19* (2013.01); *G10L 15/26* (2013.01); *H04M 3/51* (2013.01); *H04M 2201/40* (2013.01)

(58) Field of Classification Search
None
See application file for complete search history.

(56) References Cited

U.S. PATENT DOCUMENTS

| 6,785,380 B2 | 8/2004 | Ribera |
| 6,829,603 B1 | 12/2004 | Chai et al. |
| 7,275,083 B1 | 9/2007 | Seibel et al. |
| 7,486,785 B2 | 2/2009 | Flores |
| 8,108,237 B2 | 1/2012 | Bourne et al. |

(Continued)

FOREIGN PATENT DOCUMENTS

| KR | 1020180058877 | 7/2018 |
| WO | WO 2016139666 | 9/2016 |
| WO | WO 2018020517 | 2/2018 |

OTHER PUBLICATIONS

Liew, "Strategic integration of knowledge management and customer relationship 1-20 management." In: Journal of Knowledge Management. Jul. 18, 2008 (Jul. 18, 2008) Retrieved on Dec. 25, 2019 (Dec. 25, 2019) from <http://student.bms.lk/GDM/49/Slides/MarManaSampleAssi/MMAsuportingJouArti/13673270810884309.pdf> entire document.

(Continued)

*Primary Examiner* — Folashade Anderson
(74) *Attorney, Agent, or Firm* — Polsinelli PC

(57) ABSTRACT

Systems, methods, and applications for mobile intelligent outside sales assistance are provided. Embodiments include receiving speech for recognition of an outside sales call; converting the speech for recognition to text; parsing the converted text into outside sales triples; storing the outside sales triples in an enterprise knowledge graph of a semantic graph database; generating real-time outside sales insights in dependence upon the speech of the outside sales call and the stored outside triples in the enterprise knowledge graph; and presenting the real-time outside sales insights to an outside sales agent.

16 Claims, 8 Drawing Sheets

(56) References Cited

U.S. PATENT DOCUMENTS

| | | | |
|---|---|---|---|
| 8,332,279 | B2 | 12/2012 | Woolston |
| 8,411,843 | B1 | 4/2013 | Cyriac |
| 9,049,295 | B1 | 6/2015 | Cooper |
| 9,165,556 | B1 | 10/2015 | Sugar |
| 9,848,082 | B1 | 12/2017 | Lilland |
| 9,860,391 | B1 | 1/2018 | Wu et al. |
| 9,936,066 | B1 | 4/2018 | Mammen et al. |
| 9,942,779 | B1 | 4/2018 | Proctor |
| 9,948,783 | B1 | 4/2018 | Farrell |
| 10,026,092 | B2 | 7/2018 | Heater et al. |
| 10,057,423 | B1 | 8/2018 | Sheikh |
| 10,101,976 | B2 | 10/2018 | Cavalcante |
| 10,303,466 | B1 | 5/2019 | Karman |
| 10,482,384 | B1 | 11/2019 | Stoilos |
| 10,623,572 | B1* | 4/2020 | Copeland ............ H04M 3/5191 |
| 10,943,072 | B1* | 3/2021 | Jaganmohan ......... G06N 5/041 |
| 11,184,306 | B1 | 11/2021 | Angeli et al. |
| 11,797,586 | B2* | 10/2023 | Copeland ................ G06F 3/167 |
| 2003/0069780 | A1 | 4/2003 | Hailwood et al. |
| 2003/0126136 | A1 | 7/2003 | Omoigui |
| 2004/0143473 | A1 | 7/2004 | Tivey et al. |
| 2004/0210881 | A1 | 10/2004 | Friedman |
| 2005/0005266 | A1 | 1/2005 | Datig |
| 2005/0044357 | A1 | 2/2005 | Fano |
| 2005/0105712 | A1 | 5/2005 | Williams et al. |
| 2006/0095273 | A1 | 5/2006 | Montvay et al. |
| 2006/0098625 | A1 | 5/2006 | King |
| 2006/0239439 | A1 | 10/2006 | Blackwood |
| 2007/0019618 | A1 | 1/2007 | Shaffer |
| 2007/0064913 | A1 | 3/2007 | Shaffer |
| 2007/0094183 | A1 | 4/2007 | Paek et al. |
| 2007/0112571 | A1* | 5/2007 | Thirugnana ......... H04M 1/2757 |
| | | | 704/201 |
| 2007/0233561 | A1 | 10/2007 | Golec |
| 2007/0233730 | A1 | 10/2007 | Johnston |
| 2008/0162498 | A1 | 7/2008 | Omoigui |
| 2008/0275744 | A1 | 11/2008 | MacIntyre et al. |
| 2009/0070322 | A1 | 3/2009 | Salvetti |
| 2009/0132474 | A1 | 5/2009 | Ma |
| 2009/0245500 | A1 | 10/2009 | Wampler |
| 2009/0271192 | A1 | 10/2009 | Marquette |
| 2010/0010802 | A1 | 1/2010 | Ruano |
| 2010/0036788 | A1 | 2/2010 | Wu |
| 2010/0063799 | A1 | 3/2010 | Jamieson |
| 2010/0104087 | A1 | 4/2010 | Byrd et al. |
| 2010/0114563 | A1 | 5/2010 | Choi |
| 2011/0077999 | A1 | 3/2011 | Becker et al. |
| 2011/0082829 | A1 | 4/2011 | Kolovski |
| 2011/0113094 | A1 | 5/2011 | Chunilal |
| 2011/0206198 | A1 | 8/2011 | Freedman |
| 2011/0264451 | A1 | 10/2011 | Hoepfinger |
| 2012/0059776 | A1 | 3/2012 | Estes |
| 2012/0078636 | A1 | 3/2012 | Ferrucci |
| 2012/0197631 | A1 | 8/2012 | Ramani et al. |
| 2012/0233558 | A1 | 9/2012 | Naim |
| 2012/0275642 | A1 | 11/2012 | Aller |
| 2012/0303355 | A1 | 11/2012 | Liu et al. |
| 2013/0006916 | A1 | 1/2013 | McBride |
| 2013/0091090 | A1 | 4/2013 | Spivack et al. |
| 2013/0103735 | A1 | 4/2013 | Dowling |
| 2013/0163731 | A1 | 6/2013 | Yan |
| 2013/0204663 | A1 | 8/2013 | Kahlow |
| 2013/0262501 | A1* | 10/2013 | Kuchmann-Beauger .................... |
| | | | G06F 16/24535 |
| | | | 707/769 |
| 2014/0022328 | A1 | 1/2014 | Gechter et al. |
| 2014/0081585 | A1 | 3/2014 | Cappucino et al. |
| 2014/0081934 | A1 | 3/2014 | Mizell |
| 2014/0122535 | A1 | 5/2014 | Gerard |
| 2014/0164502 | A1 | 6/2014 | Khodorenko |
| 2014/0189680 | A1 | 7/2014 | Kripalani |
| 2014/0201234 | A1 | 7/2014 | Lee et al. |
| 2014/0270108 | A1 | 9/2014 | Riahi et al. |
| 2014/0278343 | A1 | 9/2014 | Tran |
| 2014/0314225 | A1 | 10/2014 | Riahi |
| 2014/0372630 | A1 | 12/2014 | Bostick |
| 2014/0379755 | A1 | 12/2014 | Kuriakose |
| 2015/0012350 | A1 | 1/2015 | Li et al. |
| 2015/0066479 | A1 | 3/2015 | Pasupalak |
| 2015/0112756 | A1 | 4/2015 | Subramanian et al. |
| 2015/0170163 | A1 | 6/2015 | Wagner et al. |
| 2015/0189085 | A1 | 7/2015 | Riahi et al. |
| 2015/0201077 | A1 | 7/2015 | Konig et al. |
| 2015/0242410 | A1 | 8/2015 | Pattabhiraman et al. |
| 2015/0254234 | A1 | 9/2015 | Dixit et al. |
| 2015/0261743 | A1 | 9/2015 | Sengupta |
| 2015/0294405 | A1 | 10/2015 | Hanson |
| 2015/0309994 | A1 | 10/2015 | Liu |
| 2015/0348551 | A1 | 12/2015 | Gruber |
| 2015/0379603 | A1 | 12/2015 | Gupta |
| 2016/0019882 | A1 | 1/2016 | Matula |
| 2016/0021181 | A1 | 1/2016 | Ianakiev et al. |
| 2016/0034457 | A1 | 2/2016 | Bradley |
| 2016/0036981 | A1 | 2/2016 | Hollenberg |
| 2016/0036982 | A1 | 2/2016 | Ristock |
| 2016/0036983 | A1 | 2/2016 | Korolev |
| 2016/0117593 | A1 | 4/2016 | London |
| 2016/0125364 | A1 | 5/2016 | Field et al. |
| 2016/0162474 | A1 | 6/2016 | Agarwal |
| 2016/0162913 | A1 | 6/2016 | Linden et al. |
| 2016/0171099 | A1 | 6/2016 | Lorge et al. |
| 2016/0171511 | A1 | 6/2016 | Goel et al. |
| 2016/0188686 | A1 | 6/2016 | Hopkins |
| 2016/0189028 | A1 | 6/2016 | Hu et al. |
| 2016/0217479 | A1 | 7/2016 | Kashyap et al. |
| 2016/0232540 | A1 | 8/2016 | Gao et al. |
| 2016/0239851 | A1 | 8/2016 | Tanner |
| 2016/0321748 | A1 | 11/2016 | Mahatm |
| 2016/0335544 | A1 | 11/2016 | Bretschneider et al. |
| 2017/0006135 | A1 | 1/2017 | Siebel et al. |
| 2017/0017694 | A1 | 1/2017 | Roytman et al. |
| 2017/0024375 | A1 | 1/2017 | Hakkani-Tur |
| 2017/0091390 | A1 | 3/2017 | Joul |
| 2017/0124193 | A1 | 5/2017 | Li |
| 2017/0147635 | A1 | 5/2017 | McAteer et al. |
| 2017/0154108 | A1 | 6/2017 | Li et al. |
| 2017/0177715 | A1 | 6/2017 | Chang |
| 2017/0195488 | A1 | 7/2017 | Pendyala |
| 2017/0200220 | A1 | 7/2017 | Nicholson |
| 2017/0262429 | A1 | 9/2017 | Harper |
| 2017/0262530 | A1 | 9/2017 | Okura |
| 2017/0293610 | A1 | 10/2017 | Tran |
| 2018/0082183 | A1 | 3/2018 | Hertz et al. |
| 2018/0115644 | A1 | 4/2018 | Al-Khaja |
| 2018/0129372 | A1 | 5/2018 | Ellis et al. |
| 2018/0144250 | A1 | 5/2018 | Kwon |
| 2018/0150459 | A1 | 5/2018 | Farid |
| 2018/0288098 | A1 | 10/2018 | Wang |
| 2018/0300310 | A1 | 10/2018 | Shinn |
| 2018/0315000 | A1 | 11/2018 | Kulkarni |
| 2018/0315001 | A1 | 11/2018 | Garner |
| 2018/0338040 | A1 | 11/2018 | Carly |
| 2018/0365772 | A1 | 12/2018 | Thompson |
| 2018/0376002 | A1 | 12/2018 | Abraham |
| 2019/0042988 | A1 | 2/2019 | Brown |
| 2019/0080370 | A1 | 3/2019 | Copeland |
| 2019/0188617 | A1 | 6/2019 | Copeland |
| 2019/0206400 | A1 | 7/2019 | Cui |
| 2019/0212879 | A1 | 7/2019 | Anand et al. |
| 2019/0220794 | A1 | 7/2019 | Kulkarni |
| 2019/0340294 | A1 | 11/2019 | Spangler |
| 2019/0370669 | A1 | 12/2019 | Pais et al. |
| 2020/0042642 | A1 | 2/2020 | Bakis |
| 2020/0097814 | A1 | 3/2020 | Devesa |
| 2020/0110835 | A1 | 4/2020 | Zhao |
| 2020/0111485 | A1* | 4/2020 | Copeland ................ H04M 3/51 |
| 2020/0160458 | A1 | 5/2020 | Bodin et al. |
| 2020/0184556 | A1 | 6/2020 | Cella |
| 2020/0372016 | A1 | 11/2020 | Rogynskyy et al. |
| 2021/0019674 | A1 | 1/2021 | Crabtree et al. |
| 2021/0406964 | A1 | 12/2021 | Copeland |
| 2022/0328034 | A1 | 10/2022 | Tv |

(56) References Cited

U.S. PATENT DOCUMENTS

| | | |
|---|---|---|
| 2023/0162121 A1 | 5/2023 | Copeland |
| 2023/0274295 A1 | 8/2023 | Copeland et al. |
| 2023/0274322 A1* | 8/2023 | Copeland ............ G06Q 30/016 705/346 |

OTHER PUBLICATIONS

Tung, "Google's human-sounding Al to answer calls at contact centers." In: ZDNet. Jul. 25, 2018 (Jul. 25, 2018) Retrieved on Dec. 25, 2019 (Dec. 25, 2019) from <https://www.zdnet.com/article/googles-human-sounding-ai-to-answer-calls-at-contact-centers/> entire document.

Wee, T., Perdana, A., & Remy, D. (2019). Data analytics dilemma at alpen hotel. Journal of Information Technology Teaching Cases, 9(2), 58-63. doi: http://dx.doi.org/10.1177/2043886919870543 (Year: 2019).

Office Action in Australian Appln. No. 2022215180, dated Aug. 3, 2023, 6 pages.

* cited by examiner

MOBILE INTELLIGENT OUTSIDE SALES ASSISTANT

PRIORITY CLAIM

This application claims priority to U.S. Provisional Application No. 63/260,106 filed on Aug. 9, 2021, the entire content of which is incorporated herein by reference.

BACKGROUND

Inside sales typically refers to sales made over the telephone, email, text, and other electronic communications channels. Outside sales typically refers to sales outside the office, usually through face-to-face interaction with customers. Inside sales agents have real-time access to a support infrastructure such as customer relationship management tools, online databases, real-time services, and other support infrastructure. Outside sales agents however often have limited or intermittent connectivity, few real-time online resources, sales meetings in less controlled environments, difficult schedules, and other challenges.

SUMMARY

In one aspect, the technology described herein features a method that includes receiving speech associated with an outside sales call, converting the speech to text, and parsing the converted text to identify outside sales triples. The method further includes storing the outside sales triples in an enterprise knowledge graph of a semantic graph database, generating, based on the outside sales triples stored in the enterprise knowledge graph and in response to a query, real-time sales insights associated with the speech of the outside sales call, and presenting the real-time sales insights on a display device of an agent associated with the outside sales call.

In another aspect, the technology described herein features a system that includes non-transitory memory device storing machine-readable instructions, and one or more processing devices operably coupled to the memory device. The one or more processing devices are configured to, upon execution of the machine-readable instructions, perform various operations. The operations include receiving speech associated with an outside sales call, converting the speech to text, and parsing the converted text to identify outside sales triples. The operations also include storing the outside sales triples in an enterprise knowledge graph of a semantic graph database, and generating, based on the outside sales triples stored in the enterprise knowledge graph and in response to a query, real-time sales insights associated with the speech of the outside sales call. The operations further include presenting the real-time sales insights on a display device of an agent associated with the outside sales call.

In another aspect, the technology described herein features non-transitory machine-readable storage devices storing machine-readable instructions, which upon execution cause one or more processing devices to perform operations. The operations include receiving speech associated with an outside sales call, converting the speech to text, and parsing the converted text to identify outside sales triples. The operations also include storing the outside sales triples in an enterprise knowledge graph of a semantic graph database, and generating, based on the outside sales triples stored in the enterprise knowledge graph and in response to a query, real-time sales insights associated with the speech of the outside sales call. The operations further include presenting the real-time sales insights on a display device of an agent associated with the outside sales call.

Each of the above aspects can include one or more of the following features. Converting the speech to text can include invoking an automated speech recognition engine to convert the speech into text in dependence upon a grammar, a lexicon, and an acoustic model. Generating the real-time sales insights can include generating the real-time sales insights in further dependence upon inside sales triples. Parsing the converted text into outside sales triples can include applying a pre-defined outside sales taxonomy and an ontology. At least a subset of the one or more processing devices can be disposed within a mobile device. Industry information can be obtained from at least one third party server, the industry information being related to an industry pertaining to a topic of the outside sales call, and the obtained industry information can be parsed to identify multiple semantic triples. The semantic triples can be stored in the enterprise knowledge graph of the semantic graph database. The real-time sales insights can be generated also on the semantic triples generated from the industry information. It may be determined that a description logic associated with the query supports deterministic identification of a result, and in response to such a determination, a machine-processable deterministic data model supported by the description logic can be accessed such that the real-time sales insights can be generated based at least in part on the deterministic machine-processable data model. A determination can be made that a structure or semantics associated with the query supports a probabilistic identification of multiple results, and in response to such a determination, a machine-processable probabilistic data model supported by the description logic can be accessed such that the real-time sales insights can be generated based at least in part on the machine-processable probabilistic data model.

In one or more implementations, the technology described herein can provide one or more of the following advantages. By providing a collection of artificial intelligence-based technologies, including natural and semantic language processing, the technology described herein allows for processing of unstructured communications into structured information that provides insights that would not be otherwise available to an outside sales agent. This in turn can potentially improve quality, efficiency, and efficacy of sales calls, leading to increased productivity and revenue.

DETAILED DESCRIPTION

Figure 1:
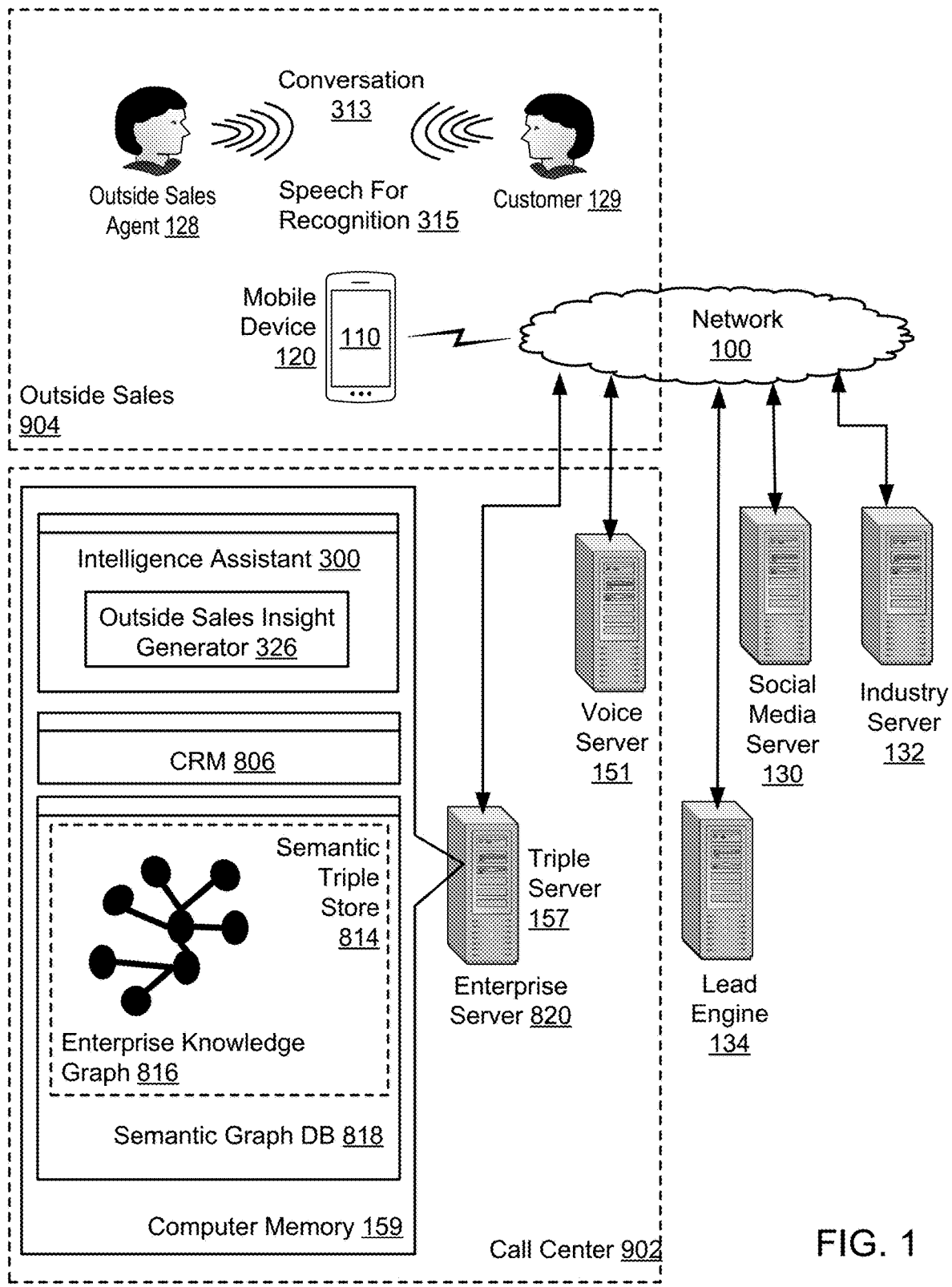
FIG. 1 sets forth a network diagram illustrating an example system for mobile intelligent outside sales assistance according to embodiments of the present invention.

Example methods, systems, apparatuses, and products for mobile intelligent outside sales assistance are described with reference to the accompanying drawings, beginning with FIG. 1. FIG. 1 sets forth a network diagram illustrating an example system for mobile intelligent outside sales assistance according to embodiments of the present technology.

The overall example system illustrated in FIG. 1 operates generally for mobile intelligent outside sales assistance according to embodiments of the present technology by receiving speech (315) for recognition of an outside sales call (904) and converting the speech for recognition to text. The system of FIG. 1 also includes parsing by the intelligence assistant (300) the converted text into outside sales triples and storing the outside sales triples in an enterprise knowledge graph (816) of a semantic graph database (818). The system of FIG. 1 includes generating, by the intelligence assistant (300), real-time outside sales insights in dependence upon the speech of the outside sales call and the stored outside triples in the enterprise knowledge graph and presenting the real-time outside sales insights to an outside sales agent (128). The system of FIG. 1 presents the real-time outside sales insights to the outside sales agent (128) through a mobile device (120).

The example of FIG. 1 depicts elements of outside sales (804) and a call center (902) according to embodiments of the present technology. In the example of FIG. 1, an outside sales agent (128) is engaged in a sales call with a customer (129). The sales call includes a conversation (313) which is received on a mobile device (120) and used to generate real-time outside sales insights for the outside sales agent (128). The outside sales agent (128) receives the real-time outside sales insights on the mobile device and is empowered to use these insights to improve both efficacy and efficiency of the outside sales call.

Mobile intelligent outside sales assistance according to various embodiments of the present technology is speech-enabled and the example of FIG. 1 includes at least one speech-enabled mobile device (120), a triple server (157), a voice server (151), and an intelligence assistant (300). As mentioned above, often the speech for recognition (315) is in the form of a conversation (313) between an outside sales agent (128) and a customer (129) during a sales call. The speech for recognition (315) can be an entire conversation, where, for example, all persons speaking are in the same room, and the entire conversation is picked up by a microphone on a speech-enabled device. The scope of speech for recognition can be reduced by providing to a speech-enabled device conversation from only to one person or a person on one side of a conversation, as only through a microphone on a headset. The scope of speech for recognition can be reduced even further by providing for recognition only speech that responds to a prompt from, for example, a VoiceXML dialogue executing on a speech-enabled device. As the scope of speech for recognition is reduced, data processing burdens are reduced across the system as a whole, although it remains an option, in some embodiments at least, to recognize entire conversations and stream across flow of all words in the conversation.

Speech from an outside sales agent or from a conversation is recognized into digitized speech by operation of a natural language processing speech recognition ("NLP-SR") engine, shown here disposed upon a voice server (151), but also amenable to installation on speech-enabled devices themselves. The speech digitized into text is then parsed into triples of description logic and stored in a semantic triple store (814) of an enterprise knowledge graph (816) in a semantic graph database (818). A triple is a three-part statement expressed in a form of logic. Depending on context, different terminologies are used to refer to effectively the same three parts of a statement in a logic. In first order logic, the parts are called constant, unary predicate, and binary predicate. In the Web Ontology Language ("OWL") the parts are individual, class, and property. In some description logics the parts are called individual, concept, and role.

In this example description, the elements of a triple are referred to as subject, predicate, and object—and expressed like this: <subject> <predicate> <object>. There are many modes of expression for triples. Elements of triples can be represented as Uniform Resource Locaters ("URLs"), Uniform Resource Identifiers ("URIs"), or International Resource Identifiers ("IRIs"). Triples can be expressed in N-Quads, Turtle syntax, TriG, Javascript Object Notation or "JSON," the list goes on and on. The expression used here, subject-predicate-object in angle brackets, is one form of abstract syntax, optimized for human readability rather than machine processing, although its substantive content is correct for expression of triples. Using this abstract syntax, here are examples of triples:

<Bob> <is a> <person>
<Bob> <is a friend of> <Alice>
<Bob> <is born on> <the $4^{th}$ of July 1990>
<Bob> <is interested in> <the Mona Lisa>
<the Mona Lisa> <was created by> <Leonardo da Vinci>
<the video 'La Joconde à Washington'> <is about> <the Mona Lisa>

The same item can be referenced in multiple triples. In this example, Bob (602) is the subject of four triples, and the Mona Lisa (618) is the subject of one triple and the object of two. This ability to have the same item be the subject of one triple and the object of another makes it possible to effect connections among triples, and connected triples form graphs.

The example of FIG. 1 includes a semantic graph database (818) which includes an enterprise knowledge graph (816). A semantic graph is a configuration of memory that uses graph structures, nodes and edges, to represent and store data. A key concept of this kind of configuration is the graph (or edge or relationship), which directly relates data items in a data store. Such a graph database contrasts with more conventional storage such as a logical table, where links among data are mere indirect metadata, and queries search for data within the store using joins to collect related data. Semantic graphs, by design, make explicit relations among data that can be difficult to model in relational systems or logical tables.

In the example of FIG. 1, the semantic graph database (818) includes a semantic triple store (814). The semantic triple store (814) of FIG. 1 includes triple stores for access by the intelligence assistant (300), the outside sales insight generator (326) and the CRM (806). The triple store (814) of FIG. 1 contains structured definitions of words not special to any particular knowledge domain, where each structured definition of the general language store is implemented with a triple of description logic. The triple store (814) also includes structured definitions of words for recognition in particular knowledge domains such as products, jargon of an industry, particular industries, geographic areas, and so on, where each structured definition of the product triple store is implemented with a triple of description logic.

The semantic triple store (814) in the example of FIG. 1 includes triples defining various forms of information useful in mobile intelligent outside sales assistance according to embodiments of the present technology. Such triples may be queried by an outside sales insight generator (326) of the intelligence assistant to retrieve insights in real time for use by the outside sales agent during the sales call. Such insights are typically generated as a result of the ongoing speech for recognition (315) of the conversation (313) between the outside sales agent (128) and the customer (129).

As mentioned above, the example of FIG. 1 includes a CRM (806). Such a CRM is a CRM system configured for the use of tele-agents in the call center (902), outside sales agents (128) engaged in outside sales (804) and other users of the enterprise. Often data stored on and accessed by the CRM is data owned by the enterprise itself and collected over time for the use of various users of the organization as will occur to those of skill in the art. In other embodiments of the present technology, the CRM may be owned by a client of the call center or for whom the outside sales agent is making a sales call and the data residing in that CRM is owned by the client.

The example of FIG. 1 also includes an intelligence assistant (300). The intelligence assistant of FIG. 1 is a speech-enabled platform capable of insight generation and management of the semantic graph database as discussed in more detail below with reference to FIG. 3. The intelligence assistant (300), the outside sales insight generator (326), and the CRM (806) are connected for data communications to an enterprise server (820), a triple server (157), a voice server (151), a lead engine (134), a social media server (130), and an industry server (132).

In the example of FIG. 1, the intelligence assistant retrieves leads from a third-party operating the lead engine (134). Such leads may provide information regarding customers often including contact information, key employees, site locations and other information regarding the customer as will occur to those of skill in the art. The leads so retrieved are parsed into semantic triples and stored the semantic triple store (814) of the enterprise knowledge graph (816).

The intelligence assistant (300), the outside sales insight generator (326), and the CRM (806) of FIG. 1 are connected for data communications with one or more social media servers (130). Such social media servers are often implemented by third parties and often provide information and insight about their users. Examples of social media companies include LinkedIn®, Facebook®, Instagram®, and others. In the example of FIG. 1, the intelligence assistant (300) may receive information directly from the social media servers or indirectly from the CRM and parse the information into semantic triples for storage in the semantic triple store of the enterprise knowledge graph.

The intelligence assistant (300), the outside sales insight generator (326), and the CRM (806) of FIG. 1 are connected for data communications with one or more industry servers. Such servers are often operated by third parties and provide current and historic information regarding a particular industry, companies in various industries and so on as will occur to those of skill in the art. In the example of FIG. 1, the intelligence assistant (300) may receive information directly from the industry servers or indirectly from the CRM and parse the information into semantic triples for storage in the semantic triple store of the enterprise knowledge graph.

The use of a lead server (824), social media server (826) and the industry server (828) in the example of FIG. 1 is for ease of explanation and not for limitation. In fact, mobile intelligent outside sales assistance according to embodiments of the present technology may make use of one or more third-party systems or internal systems in addition to or in place of the example servers describes in FIG. 1.

In the example of FIG. 1, many components useful in mobile intelligent outside sales assistance according to embodiments of the present technology are maintained in computer memory (159). In the example of FIG. 1, non-transitory computer memory devices (159) includes cache, random access memory ("RAM"), disk storage, and so on. Computer memory (159) so configured typically resides upon speech-enabled devices, or as shown here, upon one or more triple servers (157), voice servers, or enterprise servers (820)

Figure 2:
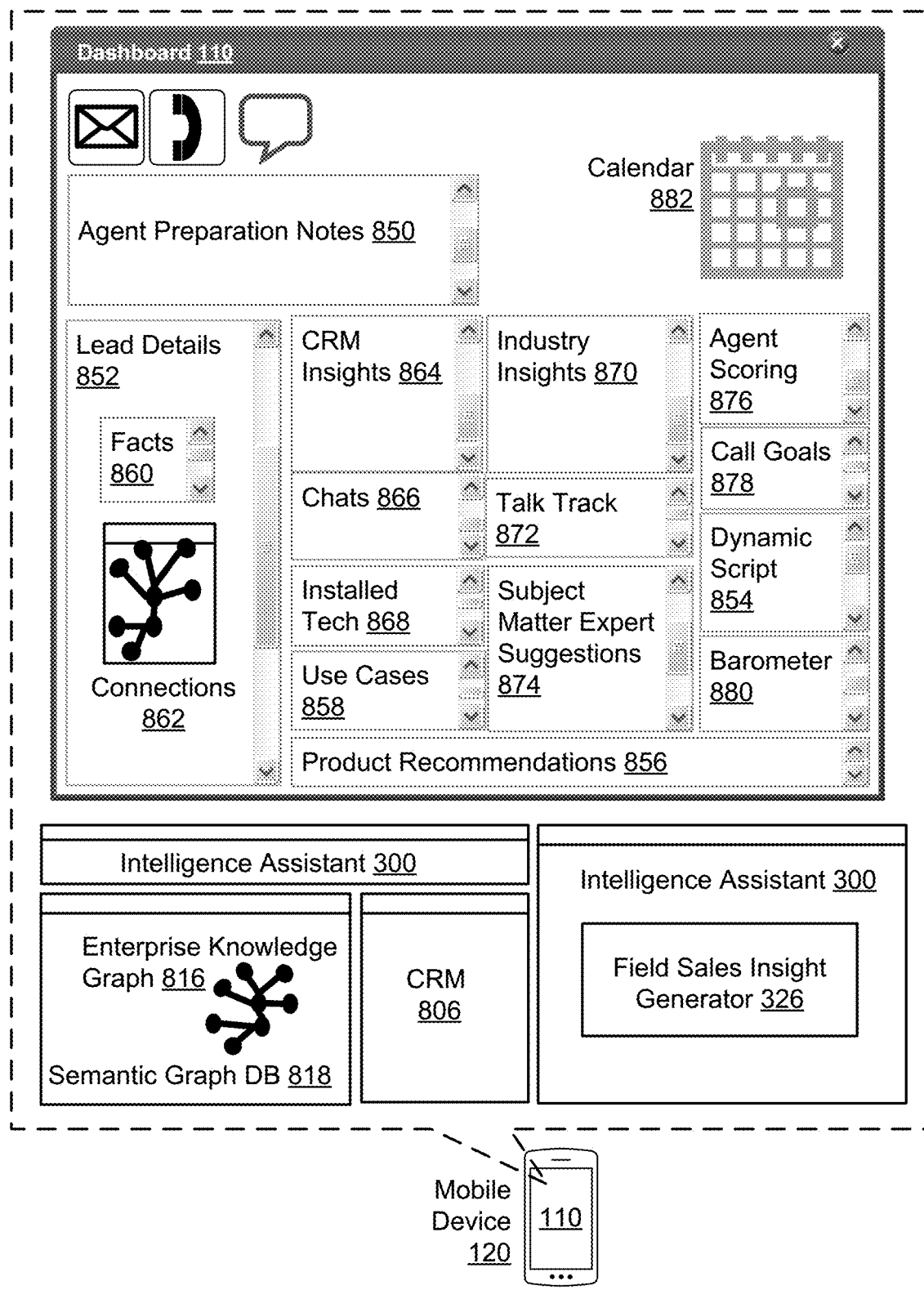
FIG. 2 sets forth a line drawing of an example system for mobile intelligent outside sales assistance according to embodiments of the present technology.

For further explanation, FIG. 2 sets forth a line drawing of an example system for mobile intelligent outside sales assistance according to embodiments of the present technology. The example of FIG. 2 includes a semantic graph database (818) which includes an enterprise knowledge graph (816). The semantic graph database (818) and enterprise knowledge graph (816) maintains a data store of proprietary and non-proprietary information regarding, among other things, customer information, products that may be discussed between an outside sales agent and customers, recommended products for the customer, sales agent notes for use during the call and so on as will occur to those of skill in the art. Such information may be provided to the outside sales agent through an outside sales agent dashboard (110) displayed on a mobile device (120). Such a dashboard may be implemented as an extremely thin client operating as a web browser that implements HTTP communications with an intelligence assistant that provides mobile intelligent outside sales assistance according to embodiments of the present technology. In such a thin-client architecture, the intelligence assistant (300), the semantic graph database (818), the CRM (806) and the intelligence assistant (300) operate remotely.

The example of FIG. 2 also includes a CRM (806) having a data store of proprietary and non-proprietary information regarding, among other things, customer information, products that may be discussed between an outside sales agent and customers, recommended products for the customer, tele-agent notes for user during the call etc. Such information may be displayed to the outside sales agent on the dashboard (110) of the mobile device.

The example of FIG. 2 includes an intelligence assistant (300) that uses a targeted collection of artificial intelligence-based technologies including natural and semantic language processing that processes unstructured communications into structured information. Such structured information can be used to generate, in dependence upon the structured information and CRM data, insights available to the outside sales agent through the mobile device, which in turn can result in improved quality, efficiency, and efficacy. In some implementations, the intelligence assistant (300) administers an enterprise knowledge graph (816) of a semantic graph database that includes structured data in the form of triples optimized for insight generation.

In the example of FIG. 2, the outside sales agent is provided real-time insights, real-time customer and product information displayed through the dashboard (110) for real-time use by the outside sales agent during the conversation with the customer. In the example of FIG. 2, the speech-enabled dashboard (110) includes a widget for the display of call preparation notes (850). Such call notes may be prepared or supplemented by the agent before, during, or after a conversation with the customer.

Widgets in this disclosure are implemented as software applications or components that perform one or more particular tasks and whose execution is administered by the intelligence assistant. Each of the widgets described in this disclosure have an accompanying GUI element as illustrated in FIG. 2. The example widgets and their associated GUI elements are provided as examples for explanation purposes, and such widgets and GUI elements should not be considered as the only possible examples. For instance, mobile intelligent outside sales assistance according to embodiments of the present technology may administer widgets that have no GUI elements or have more than one GUI element.

In the example of FIG. 2, the dashboard (110) includes a widget for the display of the lead details (852) including information describing the customer and customer's business often including name and contact information of the customer, the industry supported by the customer, the locations the customer conducts business, and other useful information that may be included in a listing of facts (860) about the customer. The dashboard (110) of FIG. 2 also displays a connections image (862) that provides to the tele-agent (128) any known connections between the customer and other customers or people or organizations traced within the CRM (806).

In the example of FIG. 2, the dashboard (110) includes a widget for the display of a calendar (882), chats (866) and widget for CRM insights (864) displaying insights regarding the customer known or derived by the CRM (806). In the example of FIG. 2, the dashboard (110) includes a widget for the display of the technology (858) currently installed in the customer's sites and locations useful in discussing products that are compatible with that installed technology with the customer.

In the example of FIG. 2, the dashboard (110) includes a widget for the display of use cases (858) describing the product that may be useful to the agent during a conversation with the customer. Often such use cases are provided by clients of the call center or clients of the sales agent to better inform customers about the products the client sells. Similarly, such clients may provide other collateral that may be useful in communicating with the customer and such collateral may come in many forms.

In the example of FIG. 2, the dashboard (110) includes a widget for the display of product recommendations (856) for the customer and a display of competing products (868) that may be sold by competitors that are compatible with the currently installed technology already in use by the customer. These product recommendations 856 may be useful to an agent (128) in preparation for or during a conversation with the customer. Such product recommendations may be provided by the semantic graph database (818), the CRM (806) or from other sources.

In the example of FIG. 2, the dashboard (110) includes a widget for the display of industry insights. Industry insights may include current trends in the customer's industry, newly available products for use in an industry, current news regarding the industry and so on as will occur to those of skill in the art. Such insights may be stored and managed by the semantic graph database (818), the CRM (806), or provided from third parties such as third parties operating industry servers, social media servers, lead servers and others.

In the example of FIG. 2, the dashboard (110) includes a widget for the display of a talk track (872). The talk track (872) includes a campaign specific introduction for use by an agent with the customer and optionally additional talking points for the agent. In some cases, an agent may want to customize a talk track (872) to include preferred vernacular, style, and other attributes. The talk track (872) is editable in the example of FIG. 2 by the agent through speech, use of a user interface, use of a keyboard, and in other ways.

In the example of FIG. 2, the dashboard (110) includes a widget for the display of subject matter expert suggestions (874). Subject matter expert suggestions (874) may be provided in real time or maintained by the semantic graph database (818), the CRM (806), or from other sources. Subject matter expert suggestions may be provided by internal subject matter experts or by third-party subject matter experts or in other ways.

In the example of FIG. 2, the dashboard (110) includes a widget for agent scoring (876). An agent score may represent the agent's place along a defined sales cycle of a campaign, the agent's rank among other agents in the enterprise, as well as other ways of scoring the agent as will occur to those of skill in the art. Such an agent score may be developed and maintained by the semantic graph database (818), the CRM (806), or other components.

In the example of FIG. 2, the dashboard (110) includes a widget for the display of sales call goals (878) for the agent. Such sales call goals are often related to the agent's place in a sales cycle defined for the particular campaign.

In the example of FIG. 2, the dashboard (110) includes a widget for the display of a dynamic script (854) often created in real-time as a guidance and aid for the agent in the conversation with the customer. Such a script may be created by the CRM (806), intelligence assistant (300), or other components based upon the current sales campaign, information relating to the customer, historic sales trends, success stories of agents and may other factors.

In the example of FIG. 2, the dashboard (110) includes a widget for the display of a barometer (880) the barometer is graphic representation or text display providing the agent with an indication of the current performance of the agent servicing a particular sales campaign. Such a barometer may be created by a CRM (806), an intelligence assistant (300), or other components based on many factors such as the goals of the sales campaign, the performance of the tele-agent or other the tele-agents servicing the sales campaign and many other factors.

The components and widgets presented in the example of FIG. 2 are for explanation and not for limitation. Components and widgets, as well as the functions they perform and information they provide may vary dramatically among various embodiments of the present technology as will occur to those of skill in the art. All such components and widgets whatever their form may be used for mobile intelligent outside sales assistance according to various embodiments of the present technology.

Figure 3:
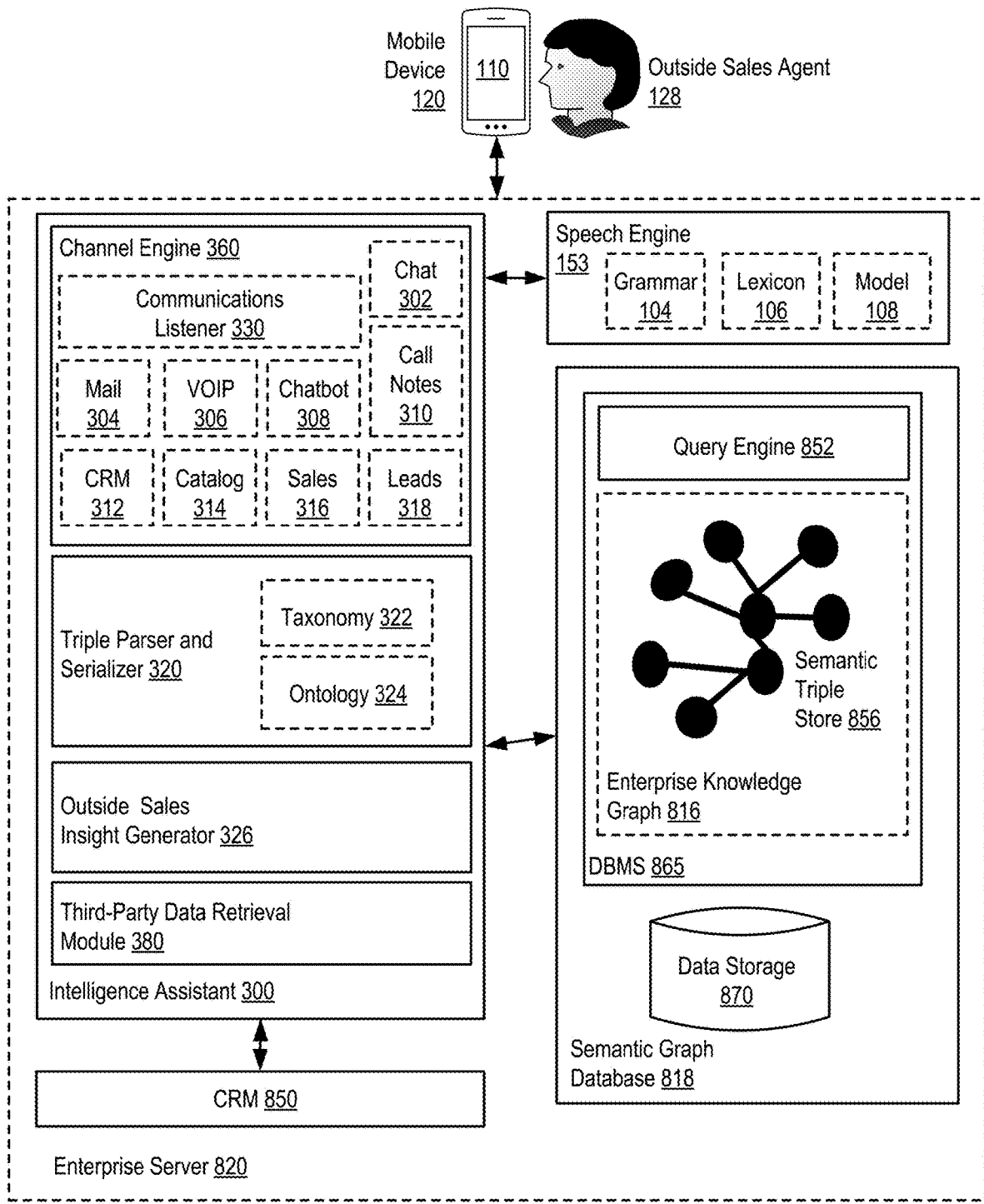
FIG. 3 sets forth a system diagram of a system for mobile intelligent outside sales assistance according to embodiments of the present technology.

For further explanation, FIG. 3 sets forth a system diagram illustrating a system for mobile intelligent outside sales assistance according to embodiments of the present technology. The system of FIG. 3 includes a mobile device (120) coupled for data communications with an enterprise server (820). The example enterprise server of FIG. 3 is implemented as one or more computers that stores programs serving the collective needs of an enterprise rather than a single user or a single department. An enterprise server can refer to both the computer hardware and its main software, operating system, and so on.

The mobile device (120) of FIG. 1 is speech enabled and provides an interface such as a dashboard (110) to the outside sales agent (128) to provide mobile intelligent outside sales assistance in accordance with embodiments of the present technology.

In some embodiments, the interface may be implemented as an extremely thin client with little more than a web browser communicating with the enterprise server. In other embodiments, the interface may be a user interface of a much more substantial client-side installation capable of many functions performed by elements shown as stored on the enterprise server in the example of FIG. 3.

Residing on the enterprise server (820) in the example system of FIG. 3 is an intelligence assistant (300) that includes a channel engine (800), a triple parser and serializer (320), and an outside sales insight generator (326) residing on an enterprise server (820). Also residing on the enterprise server (820) in the example of FIG. 3 is a speech engine (153) and a semantic graph database (818)

The intelligence assistant (300) of FIG. 3 is a targeted collection of artificial intelligence-based technologies including natural and semantic language processing that processes unstructured communications into structured information and generates in dependence upon the structured information insights available for mobile intelligent outside sales assistance, ultimately driving improved quality and efficiency of the tele-agent.

The semantic graph database (818) of FIG. 3 is a type of graph database that is capable of integrating heterogeneous data from many sources and making links between datasets. It focuses on the relationships between entities and is able to infer new knowledge out of existing information. There semantic graph database of FIG. 3 is used to infer or understand the meaning of information. The semantic technology of FIG. 3 can link new information automatically, without manual user intervention or the database being explicitly pre-structured. This automatic linking is powerful when fusing data from inside and outside company databases, such as corporate email, documents, spreadsheets, customer support logs, relational databases, government/ public/industry repositories, news feeds, customer data, social networks and much more. In traditional relational databases this linking involves complex coding, data warehouses and heavy pre-processing with exact a priori knowledge of the types of queries to be asked.

The semantic graph database (818) of FIG. 3 includes a database management system 'DBMS' (865) and data storage (870). The DBMS of FIG. 3 includes an enterprise knowledge graph (816) and a query engine (852). The enterprise knowledge graph of FIG. 3 is a structured representation of data stored in data storage (870). The query engine of FIG. 3 receives structured queries and retrieves stored information in response.

The system of FIG. 3 includes a speech engine (153). The example speech engine includes an NLP engine and ASR engine for speech recognition and text-to-speech ('TTS') for generating speech. The example speech engine (153) includes a grammar (104), a lexicon (106), and a language-specific acoustic model (108) as discussed in more detail below.

The intelligence assistant (300) of FIG. 3 includes a channel engine (360), a module of automated computing machinery that administers communications over disparate communications channels such that information may be ingested into the intelligent assistant without limitation to its original form or communications channel. The channel engine (360) establishes communications sessions using disparate protocols such as SMS, HTTP, VOIP and other telephony, POTS, email, text streams, static text, and others.

In the example of FIG. 3, the channel engine (360) is configured to administer communications through chat (302) and chatbots (308) through the use of, for example, instant messaging protocols such as SMS, Bonjour, MSNP, and many others as will occur to those of skill in the art. The example channel engine (360) administers communications with email (304) using various email protocols such as IMAP, POP3, SMTP, Exchange, and others. The example channel engine (360) may administer communications using voice over Internet Protocol ('VOIP') communications with live, recorded, or automated participants. The communications channel may also administer communications with engines, services, and other resources to retrieve static call notes (310), communicated with a CRM (312) static catalogs (314), sales engines (316), lead engines (318), and other resources such as through the use of API's or other invocation methods.

Communications administered by the communications engine may be text-based and often that text is maintained to be ingested by the intelligence assistant. Other communications may be live or recorded speech which is converted to text by the speech engine (153) for consumption by the intelligence assistant.

The channel engine (360) provides an always-on communications listener (330) that listens over each of the communications channels and provides the communication for use by the intelligence engine. Once the communications is ingested by the intelligence assistant the text is then parsed into semantic triples such that the information may be usefully used to identify sales insights. The intelligence assistant (300) of FIG. 3 therefore includes a triple parser and serializer (306). The triple parser of FIG. 3 takes as input a file in some format such as the standard RDF/XML format, which is compatible with the more widespread XML standard. The triple parser takes such a file as input and converts it into an internal representation of the triples that are expressed in that file. At this point, the triples are stored in the triple store are available for all the operations of that store. Triples parsed and stored in the triple store can be serialized back out using the triple serializer (306).

The triple parser of Figure creates triples in dependence upon a taxonomy (322) and an ontology (324). The taxonomy (322) includes words or sets of words with defined semantics that will be stored as triples. To parse speech into semantic triples the triple parser receives text converted from speech by the speech engine and identifies portions of that text that correspond with the taxonomy and forms triples using the defined elements of the taxonomy.

The triple parser of FIG. 3 also creates triples in dependence upon an ontology (324). An ontology is a formal specification that provides sharable and reusable knowledge representation. An ontology specification includes descriptions of concepts and properties in a domain, relationships between concepts, constraints on how the relationships can be used and other concepts and properties.

The enterprise server (820) of FIG. 3 includes a CRM (806), automated computing machinery that provides contact management, sales management, agent productivity administration, and other services targeted to improved customer relations and ultimately customer satisfaction and enterprise profitability. The example CRM of FIG. 3 manages manage customer relationships across the entire customer lifecycle, individual sales cycles, campaigns, driving marketing, sales, and customer service and so on. Such information is usefully ingested, parsed, and stored by the intelligence assistant for use in generating insights according to embodiments of the present technology.

The intelligence assistant (300) of FIG. 3 includes an outside sales insight generator (326). The insight generator (326) of FIG. 3 queries the query engine (853) of the semantic graph database (818) and identifies insights in dependence upon the results of the queries. Insight generators according to embodiments of the present technology often generate queries using a query language. Query languages may be implemented as an RDF query language such as SPARQL.

In some embodiments of the present technology, insights may be selected from predefined insights meeting certain criteria of the search results or may be formed from the query results themselves. Such insights may be useful to an outside sales agent during a conversation with a customer. Examples of insights useful in mobile intelligent outside sales assistance according to embodiments of the present technology include information about an industry, a customer job title, insights relating to budget, authority, need, and time ('BANT'), cost and pricing information, competitive products, positive or negative sentiment in call, chat, email or other communication, identification of key individuals, targets reached, contacts reached, industry terms, next best action for a tele-agent, product recommendations, custom metrics, and others.

The intelligence assistant (300) of FIG. 3 includes a third-party data retrieval module (380). The third-party data retrieval module (380) of FIG. 3 is a module of automated computing machinery configured to retrieve information from third-party resources such as industry servers, social media servers, clients, customers, and other resources.

Figure 4:
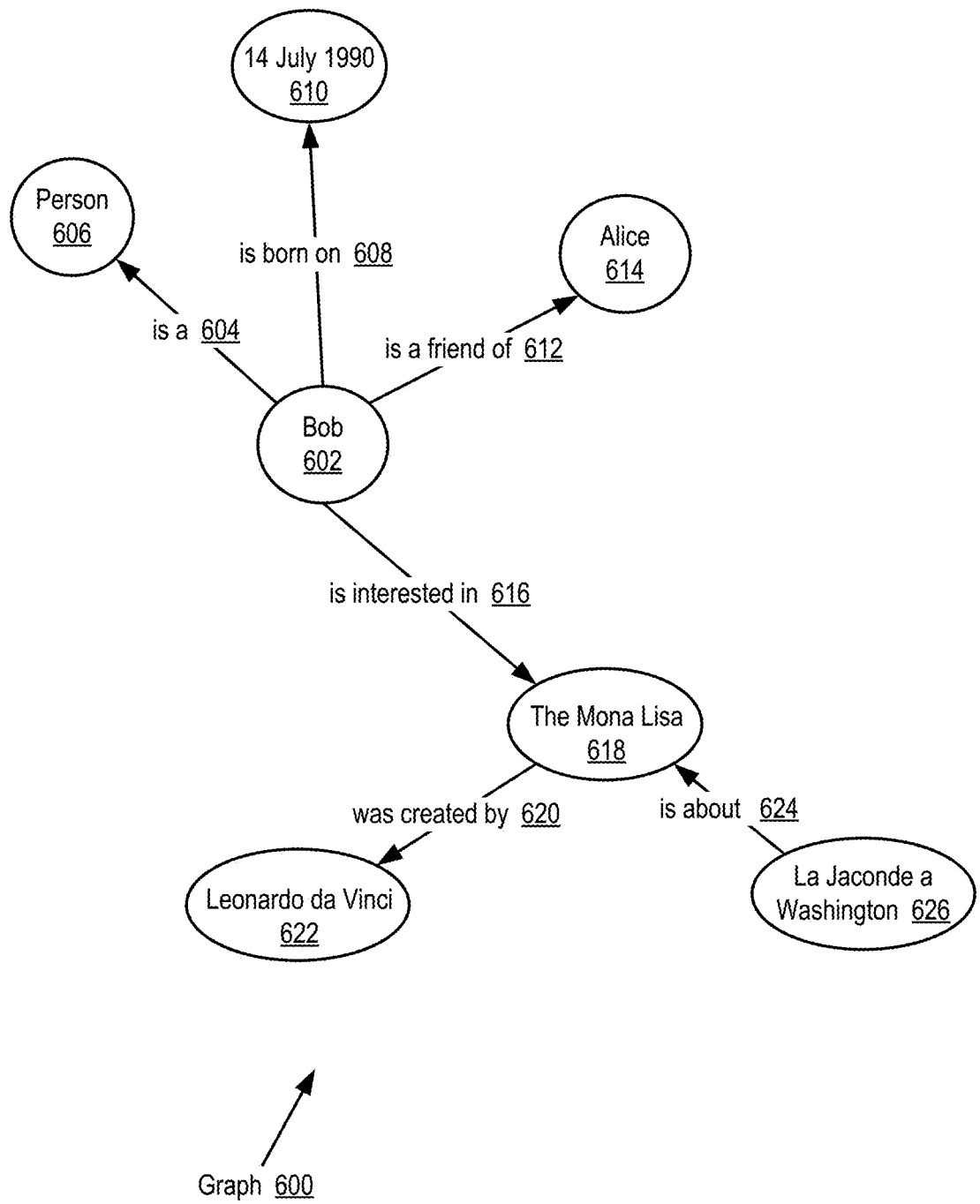
FIG. 4 sets forth a line drawing of a graph.

For further explanation of relations among triples and graphs, FIG. 4 sets forth a line drawing of a graph (600). The example graph of FIG. 4 implements in graph form the example triples set forth above regarding Bob (602) and the Mona Lisa (618). In the example of FIG. 4, the graph edges (604, 608, 612, 616, 620, 624) represent respectively relations among the node, that is, represent the predicates <is a>, <is a friend of>, <is born on>, <is interested in>, <was created by>, and <is about>. The nodes themselves represent the subjects and objects of the triples, <Bob> (602), <person> (606), <Alice> (614), <the 4$^{th}$ of July 1990> (610), <the Mona Lisa> (618), <Leonardo da Vinci> (622), and <the video 'La Joconde á Washington'> (626).

In systems of knowledge representation, knowledge represented in graphs of triples, including, for example, knowledge representations implemented in Prolog databases, Lisp data structures, or in RDF-oriented ontologies in RDFS, OWL, and other ontology languages. Search and inference are effected against such graphs by search engines configured to execute semantic queries in, for example, Prolog or SPARQL. Prolog is a general-purpose logic programming language. SPARQL is a recursive acronym for "SPARQL Protocol and RDF Query Language." Prolog supports queries against connected triples expressed as statements and rules in a Prolog database. SPARQL supports queries against ontologies expressed in RDFS or OWL or other RDF-oriented ontologies. Regarding Prolog, SPARQL, RDF, and so on, these are examples of technologies explanatory of example embodiments of the present technology. Thus, such are not limitations of the present technology.

Knowledge representations useful according to embodiments of the present technology can take many forms, now or in the future, and all such are now and will continue to be well within the scope of the present technology.

A description logic is a member of a family of formal knowledge representation languages. Some description logics are more expressive than propositional logic but less expressive than first-order logic. In contrast to first-order logics, reasoning problems for description logics are usually decidable. Efficient decision procedures therefore can be implemented for problem of search and inference in description logics. There are general, spatial, temporal, spatiotemporal, and fuzzy descriptions logics, and each description logic features a different balance between expressivity and reasoning complexity by supporting different sets of mathematical constructors.

Search queries are disposed along a scale of semantics. A traditional web search, for example, is disposed upon a zero point of that scale, no semantics, no structure. A traditional web search against the keyword "derivative" returns HTML, documents discussing the literary concept of derivative works as well as calculus procedures. A traditional web search against the keyword "differential" returns HTML pages describing automobile parts and calculus functions.

Other queries are disposed along the scale, some semantics, some structure, not entirely complete. This is actually a current trend in web search. Such systems may be termed executable rather than decidable. From some points of view, decidability is not a primary concern. In many Web applications, for example, data sets are huge, and they simply do not require a 100 percent correct model to analyze data that may have been spidered, scraped, and converted into structure by some heuristic program that itself is imperfect. People use Google® because it can find good answers a lot of the time, even if it cannot find perfect answers all the time. In such rough-and-tumble search environments, provable correctness may not always be a key goal.

Other classes of queries are disposed where correctness of results is key, and decidability enters. A user who is a tele-agent in a data center speaking by phone with an automotive customer discussing a front differential is concerned not to be required to sort through calculus results to find correct terminology. Such a user needs correct definitions of automotive terms, and the user needs query results in conversational real time, that is, for example, within seconds.

In formal logic, a system is decidable if there exists a method such that, for every assertion that can be expressed in terms of the system, the method is capable of deciding whether or not the assertion is valid within the system. In practical terms, a query against a decidable description logic will not loop indefinitely, crash, fail to return an answer, or return a wrong answer. A decidable description logic supports data models or ontologies that are clear, unambiguous, and machine-processable. Undecidable systems do not. A decidable description logic supports algorithms by which a computer system can determine equivalence of classes defined in the logic. Undecidable systems do not. Decidable description logics can be implemented in C, C++, SQL, Lisp, RDF/RDFS/OWL, and so on. In the RDF space, subdivisions of OWL vary in decidability. Full OWL does not support decidability. OWL DL does.

Figure 5:
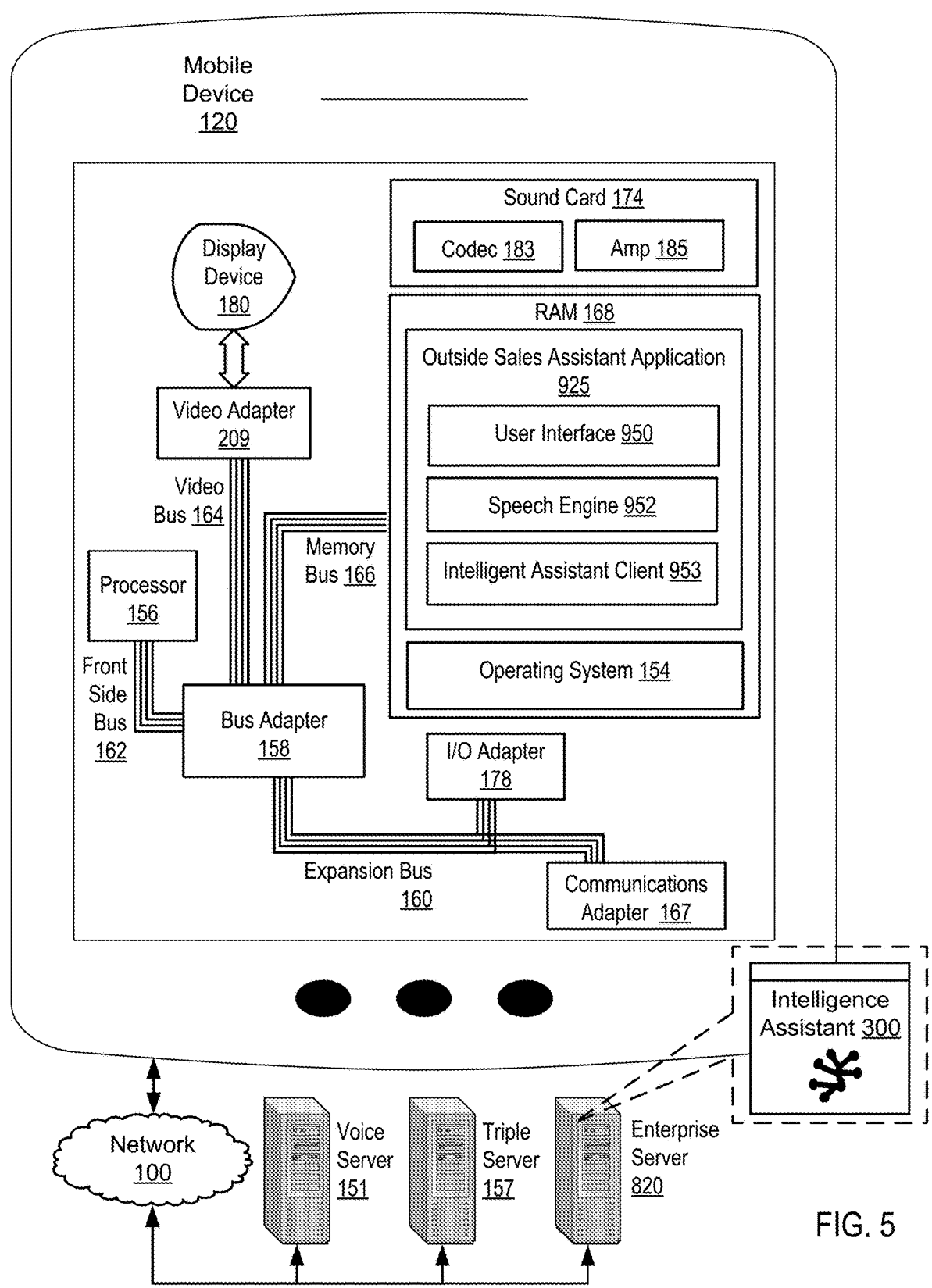
FIG. 5 sets forth a line drawing of a mobile device useful in mobile intelligent outside sales assistance according to embodiments of the present technology.

For further explanation, FIG. 5 sets forth a functional block diagram of example system for mobile intelligent outside sales assistance in a thin-client architecture according to embodiments of the present technology. A thin-client architecture is a client-server architecture in which at least some of, perhaps most of, perhaps all of, speech processing, triple processing, and insight generation is off-loaded from the client to servers. Thinness of a thin client varies. The speech-enabled mobile device (120) in the example of FIG.

5 is a thin client in which most speech processing is off-loaded to a voice server (151). The speech-enabled device (120) accepts voice input, but then transfers the voice input through for example a VOIP connection to the voice server (151) where all speech processing is performed. The example mobile device (120) can be implemented with no semantic query engine and no triple store, merely passing queries through to a triple server (157) that itself carries out all triple storage and all query processing.

The thin-client speech-enabled device in the example of FIG. 5 is automated computer machinery that includes a processor (156), RAM (168), data buses (162, 164, 166, 160), video (180, 209), data communications (167), I/O (178), and disk storage. Disposed in RAM are a speech-enabled outside sales assistant application (925) including a user interface (950), a speech engine (952), and an intelligent assistant client (953).

The speech-enabled mobile device (120) and a voice server (151) are connected for data communication by a VOIP connection through a data communications network (100). A speech-enabled outside sales application (925) runs on the speech-enabled mobile device (120). The speech-enabled application (925) may be implemented as a set or sequence of X+V or SALT documents that execute on a speech-enabled browser, a Java Voice application that executes on a Java Virtual Machine, or a speech-enabled application implemented in other technologies as may occur to those of skill in the art. The example speech-enabled mobile device of FIG. 5 also includes a sound card (174), which is an example of an I/O adapter specially designed for accepting analog audio signals from a microphone and converting the audio analog signals to digital form for further processing by a codec (183).

VOIP stands for 'Voice Over Internet Protocol,' a generic term for routing speech over an IP-based data communications network. The speech data flows over a general-purpose packet-switched data communications network, instead of traditional dedicated, circuit-switched voice transmission lines. Protocols used to carry voice signals over the IP data communications network are commonly referred to as 'Voice over IP' or 'VOIP' protocols. VOIP traffic may be deployed on any IP data communications network, including data communications networks lacking a connection to the rest of the Internet, for instance on a private building-wide local area data communications network or 'LAN.'

Many protocols may be used to effect VOIP, including, for example, types of VOIP effected with the IETF's Session Initiation Protocol ('SIP') and the ITU's protocol known as 'H.323.' SIP clients use TCP and UDP port 5060 to connect to SIP servers. SIP itself is used to set up and tear down calls for speech transmission. VOIP with SIP then uses RTP for transmitting the actual encoded speech. Similarly, H.323 is an umbrella recommendation from the standards branch of the International Telecommunications Union that defines protocols to provide audio-visual communication sessions on any packet data communications network.

A speech-enabled application is typically a user-level, speech-enabled, client-side computer program that presents a voice interface to user, provides audio prompts and responses, and accepts input speech for recognition. The example speech-enabled outside sales assistant application (925) includes a speech engine (952). Speech-engine provides a speech interface through which a user may provide oral speech for recognition through a microphone and have the speech digitized through an audio amplifier (185) and a coder/decoder ('codec') (183) of a sound card (174) and provide the digitized speech for recognition to a voice server (151). Speech engine packages digitized speech in recognition request messages according to a VOIP protocol and transmits the speech to voice server (151) through the VOIP connection (216) on the network (100).

Voice server (151) provides voice recognition services for speech-enabled devices by accepting dialog instructions, VoiceXML segments, or the like, and returning speech recognition results, including text representing recognized speech, text for use as variable values in dialogs, and output from execution of semantic interpretation scripts as well as voice prompts. Voice server (151) includes computer programs that provide text-to-speech ('TTS') conversion for voice prompts and voice responses to user input in speech-enabled applications such as, for example, X+V applications, SALT applications, or Java Speech applications.

The speech-enabled device (152) in the example of FIG. 5 may in some embodiments includes a semantic query engine, a module of automated computing machinery that accepts and executes against triple stores semantic queries. A semantic query is a query designed and implemented against structured data. Semantic queries utilize logical operators, namespaces, pattern matching, subclassing, transitive relations, semantic rules, and contextual full text search. Semantic queries work on named graphs, linked data, or triples. In embodiments of the present technology, triples typically are linked so as to form graphs. This enables a semantic query to process actual relationships between items of information and infer answers from the network of data.

Example formulations of semantic queries are in C, C++, Java, Prolog, Lisp, and so on. The semantic web technology stack of the W3C, for example, offers SPARQL to formulate semantic queries in a syntax similar to SQL. Semantic queries are used against data structured in triple stores, graph databases, semantic wikis, natural language, and artificial intelligence systems. As mentioned, semantic queries work on structured data, and in the particular examples of the present case, the structured data is words described and defined in semantic triples connected in ways that conform to a description logic. In many embodiments of the present technology, semantic queries are asserted against data structured according to a description logic that implements decidability.

In the example apparatus of FIG. 5, the speech-enabled mobile device is coupled for data communication through a communications adapter (167) and a data communications network (100) to a triple server (157). The triple server (157) provides large volume triple stores. The triple server is a configuration of automated computing machinery that serializes triples and stores serialized triples in relational databases, tables, files, or the like. The triple server retrieves upon request from non-volatile storage such serialized triples, parses the serialized triples into triple stores, and provides such triple stores upon request to speech-enabled devices for use in systems that utilize the triples according to embodiments of the present technology.

In the example of FIG. 5, the speech-enabled mobile device is coupled for data communication through the communications adapter (167) and network (100) to an enterprise server (820) providing server-side functionality for mobile intelligent outside sales assistance according to embodiments of the present technology. The example enterprise server (820) hosts an intelligence assistant that generates real-time sales insights and provides such insights to the client-side application (925) for display to a sales agent.

The example of FIG. 5 illustrates a thin-client architecture. This is for explanation and not for limitation. In other embodiments, systems for mobile intelligent outside sales assistance may be implemented with varying degrees of thin or think clients. A thick-client architecture is a client-server architecture in which all or most of the functionality required to administer mobile intelligent outside sales assistance is supported directly on client-side speech-enabled devices rather than on servers. Servers are used for backup and synchronization rather than speech recognition or semantic queries for example. A thick client requires resources, processor power and storage, possibly not always available on a small device such as a smartwatch, mobile phone, or tablet. In a thick client with sufficient data processing resources, however, all pertinent functionality, queries, triples, speech, are typically immediately and fully useful, regardless of network availability.

Mobile intelligent outside sales assistance according to embodiments of the present technology, particularly in a thin-client architecture, may be implemented with one or more voice servers. A voice server is a computer, that is, automated computing machinery, that provides speech recognition and speech synthesis. For further explanation, therefore, FIG. 6 sets forth a block diagram of automated computing machinery comprising an example of a computer useful as a voice server (151) for a speech-enabled device useful in mobile intelligent outside sales assistance according to embodiments of the present technology. The voice server (151) of FIG. 6 includes at least one computer processor (156) or 'CPU' as well as random access memory (168) ('RAM') which is connected through a high-speed memory bus (166) and bus adapter (158) to processor (156) and to other components of the voice server.

Stored in RAM (168) is a voice server application (188), a module of computer program instructions capable of operating a voice server in a system that is configured for use in configuring memory according to some embodiments of the present technology. Voice server application (188) provides voice recognition services for multimodal devices by accepting requests for speech recognition and returning speech recognition results, including text representing recognized speech, text for use as variable values in dialogs, and text as string representations of scripts for semantic interpretation. Voice server application (188) also includes computer program instructions that provide text-to-speech ('TTS') conversion for voice prompts and voice responses to user input in speech-enabled applications such as, for example, speech-enabled browsers, X+V applications, SALT applications, or Java Speech applications, and so on.

Voice server application (188) may be implemented as a web server, implemented in Java, C++, Python, Perl, or any language that supports X+V, SALT, VoiceXML, or other speech-enabled languages, by providing responses to HTTP requests from X+V clients, SALT clients, Java Speech clients, or other speech-enabled client devices. Voice server application (188) may, for a further example, be implemented as a Java server that runs on a Java Virtual Machine (102) and supports a Java voice framework by providing responses to HTTP requests from Java client applications running on speech-enabled devices. And voice server applications that support embodiments of the present technology may be implemented in other ways, and such ways are within the scope of the present technology.

The voice server (151) in this example includes a natural language processing speech recognition ("NLP-SR") engine (153). An NLP-SR engine is sometimes referred to in this paper simply as a 'speech engine.' A speech engine is a functional module, typically a software module, although it may include specialized hardware also, that does the work of recognizing and generating human speech. In this example, the speech engine (153) is a natural language processing speech engine that includes a natural language processing ("NLP") engine (155). The NLP engine accepts recognized speech from an automated speech recognition ('ASR') engine, processes the recognized speech into parts of speech, subject, predicates, object, and so on, and then converts the recognized, processed parts of speech into semantic triples for inclusion in triple stores.

The speech engine (153) includes an automated speech recognition ('ASR') engine for speech recognition and a text-to-speech ('TTS') engine for generating speech. The speech engine also includes a grammar (104), a lexicon (106), and a language-specific acoustic model (108). The language-specific acoustic model (108) is a data structure, a table or database, for example, that associates speech feature vectors ('SFVs') with phonemes representing pronunciations of words in a human language often stored in a vocabulary file. The lexicon (106) is an association of words in text form with phonemes representing pronunciations of each word; the lexicon effectively identifies words that are capable of recognition by an ASR engine. Also stored in RAM (168) is a Text-To-Speech ('TTS') Engine (194), a module of computer program instructions that accepts text as input and returns the same text in the form of digitally encoded speech, for use in providing speech as prompts for and responses to users of speech-enabled systems.

The grammar (104) communicates to the ASR engine (150) the words and sequences of words that currently may be recognized. For further explanation, distinguish the purpose of the grammar and the purpose of the lexicon. The lexicon associates with phonemes all the words that the ASR engine can recognize. The grammar communicates the words currently eligible for recognition. The two sets at any particular time may not be the same.

Grammars may be expressed in a number of formats supported by ASR engines, including, for example, the Java Speech Grammar Format ('JSGF'), the format of the W3C Speech Recognition Grammar Specification ('SRGS'), the Augmented Backus-Naur Format ('ABNF') from the IETF's RFC2234, in the form of a stochastic grammar as described in the W3C's Stochastic Language Models (N-Gram) Specification, and in other grammar formats as may occur to those of skill in the art. Grammars typically operate as elements of dialogs, such as, for example, a VoiceXML <menu> or an X+V <form>. A grammar's definition may be expressed in-line in a dialog. Or the grammar may be implemented externally in a separate grammar document and referenced from with a dialog with a URI. Here is an example of a grammar expressed in JSFG:

```
<grammar scope="dialog" ><![CDATA[
  #JSGF V1.0;
  grammar command;
  <command> = [remind me to] call | phone | telephone <name>
  <when>;
  <name> = bob | martha | joe | pete | chris | john | harold;
  <when> = today | this afternoon | tomorrow | next week;
]]>
</grammar>
```

In this example, the elements named <command>, <name>, and <when> are rules of the grammar. Rules are a combination of a rulename and an expansion of a rule that advises an ASR engine or a voice interpreter which words presently can be recognized. In this example, expansion includes conjunction and disjunction, and the vertical bars '|' mean 'or.' An ASR engine or a voice interpreter processes the rules in sequence, first <command>, then <name>, then <when>. The <command> rule accepts for recognition 'call' or 'phone' or 'telephone' plus, that is, in conjunction with, whatever is returned from the <name> rule and the <when> rule. The <name> rule accepts 'bob' or 'martha' or 'joe' or 'pete' or 'chris' or 'john' or 'harold', and the <when> rule accepts 'today' or 'this afternoon' or 'tomorrow' or 'next week.' The command grammar as a whole matches utterances like these, for example:

"phone bob next week,"
"telephone martha this afternoon,"
"remind me to call chris tomorrow," and
"remind me to phone pete today."

The voice server application (188) in this example is configured to receive, from a speech-enabled client device located remotely across a network from the voice server, digitized speech for recognition from a user and pass the speech along to the ASR engine (150) for recognition. ASR engine (150) is a module of computer program instructions, also stored in RAM in this example. In carrying out automated speech recognition, the ASR engine receives speech for recognition in the form of at least one digitized word and uses frequency components of the digitized word to derive a speech feature vector or SFV. An SFV may be defined, for example, by the first twelve or thirteen Fourier or frequency domain components of a sample of digitized speech. The ASR engine can use the SFV to infer phonemes for the word from the language-specific acoustic model (108). The ASR engine then uses the phonemes to find the word in the lexicon (106).

Also stored in RAM is a VoiceXML interpreter (192) which includes Dialog (522), a module of computer program instructions that processes VoiceXML grammars. VoiceXML input to VoiceXML interpreter (192) may originate, for example, from VoiceXML clients running remotely on speech-enabled devices, from X+V clients running remotely on speech-enabled devices, from SALT clients running on speech-enabled devices, from Java client applications running remotely on multimedia devices, and so on. In this example, VoiceXML interpreter (192) interprets and executes VoiceXML segments representing voice dialog instructions received from remote speech-enabled devices and provided to VoiceXML interpreter (192) through voice server application (188).

A speech-enabled application (925 on FIG. 5) in a thin-client architecture may provide voice dialog instructions, VoiceXML segments, VoiceXML <form> elements, and the like, to VoiceXML interpreter (149) through data communications across a network with such a speech-enabled application. The voice dialog instructions include one or more grammars, data input elements, event handlers, and so on, that advise the VoiceXML interpreter how to administer voice input from a user and voice prompts and responses to be presented to a user. The VoiceXML interpreter administers such dialogs by processing the dialog instructions sequentially in accordance with a VoiceXML Form Interpretation Algorithm ('FIA') (193). The VoiceXML interpreter interprets VoiceXML dialogs provided to the VoiceXML interpreter by a speech-enabled application.

As mentioned above, a Form Interpretation Algorithm ('FIA') drives the interaction between the user and a speech-enabled application. The FIA is generally responsible for selecting and playing one or more speech prompts, collecting a user input, either a response that fills in one or more input items, or a throwing of some event, and interpreting actions that pertained to the newly filled-in input items. The FIA also handles speech-enabled application initialization, grammar activation and deactivation, entering and leaving forms with matching utterances and many other tasks. The FIA also maintains an internal prompt counter that is increased with each attempt to provoke a response from a user. That is, with each failed attempt to prompt a matching speech response from a user an internal prompt counter is incremented.

Also stored in RAM (168) is an operating system (154). Operating systems useful in voice servers according to embodiments of the present technology include UNIX™, Linux™, Microsoft NT™, AIX™, IBM's i5/OS™, and others as will occur to those of skill in the art. Operating system (154), voice server application (188), VoiceXML interpreter (192), ASR engine (150), JVM (102), and TTS Engine (194) in the example of FIG. 5 are shown in RAM (168), but many components of such software typically are stored in non-volatile memory also, for example, on a disk drive (170).

Figure 6:
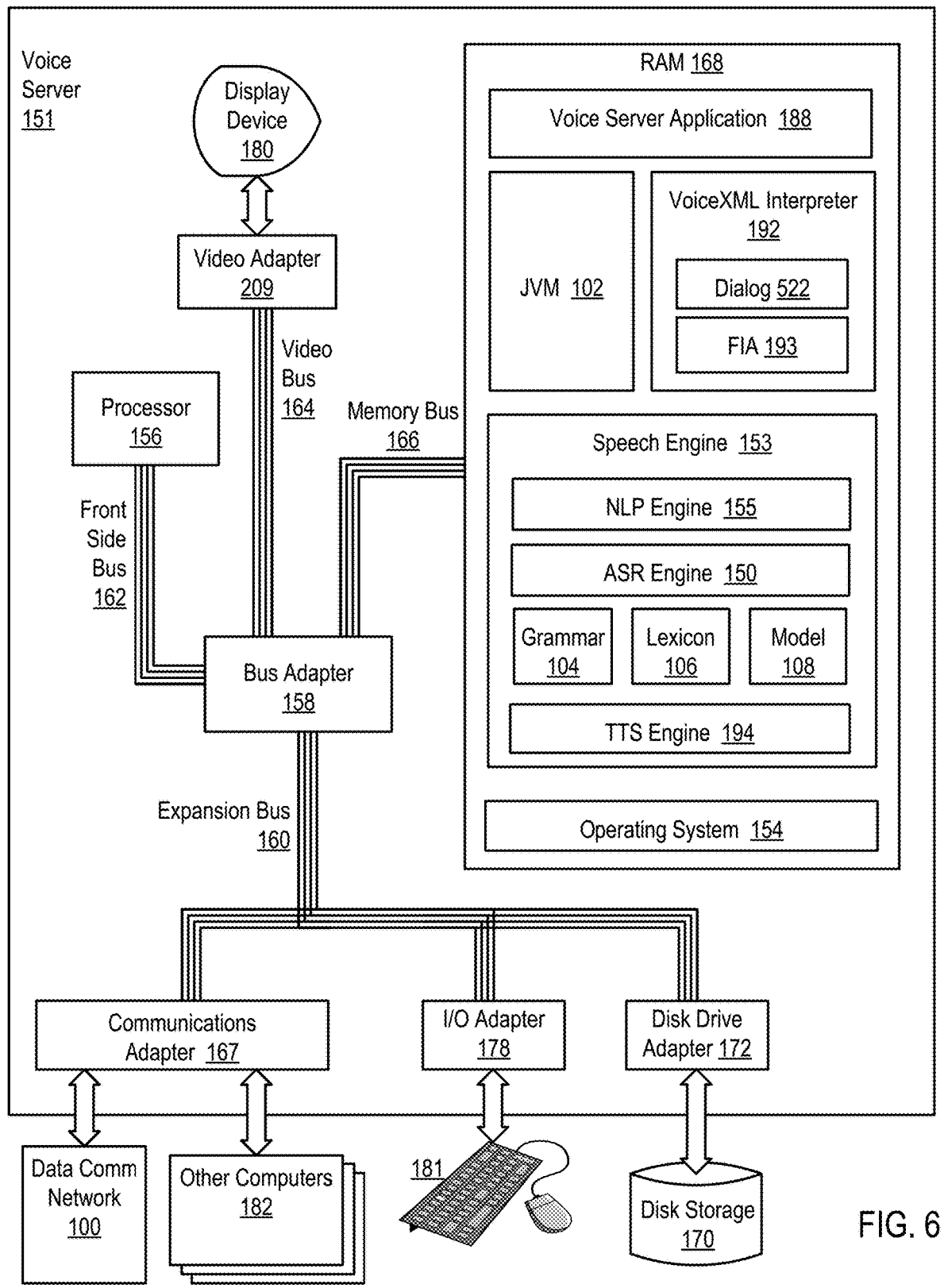
FIG. 6 sets forth a block diagram of automated computing machinery comprising an example of a computer useful as a voice server for mobile intelligent outside sales assistance according to embodiments of the present technology.

Voice server (151) of FIG. 6 includes bus adapter (158), a computer hardware component that contains drive electronics for high-speed buses, the front side bus (162), the video bus (164), and the memory bus (166), as well as drive electronics for the slower expansion bus (160). Examples of bus adapters useful in voice servers according to embodiments of the present technology include the Intel Northbridge, the Intel Memory Controller Hub, the Intel Southbridge, and the Intel I/O Controller Hub. Examples of expansion buses useful in voice servers according to embodiments of the present technology include Industry Standard Architecture ('ISA') buses and Peripheral Component Interconnect ('PCI') buses.

Voice server (151) of FIG. 6 includes disk drive adapter (172) coupled through expansion bus (160) and bus adapter (158) to processor (156) and other components of the voice server (151). Disk drive adapter (172) connects non-volatile data storage to the voice server (151) in the form of disk drive (170). Disk drive adapters useful in voice servers include Integrated Drive Electronics (IDE') adapters, Small Computer System Interface (SCSI') adapters, and others as will occur to those of skill in the art. In addition, non-volatile computer memory may be implemented for a voice server as an optical disk drive, electrically erasable programmable read-only memory (so-called 'EEPROM' or 'Flash' memory), RAM drives, and so on.

The example voice server of FIG. 6 includes one or more input/output ('I/O') adapters (178). I/O adapters in voice servers implement user-oriented input/output through, for example, software drivers and computer hardware for controlling output to display devices such as computer display screens, as well as user input from user input devices (181) such as keyboards and mice. The example voice server of FIG. 5 includes a video adapter (209), which is an example of an I/O adapter specially designed for graphic output to a display device (180) such as a display screen or computer monitor. Video adapter (209) is connected to processor (156) through a high-speed video bus (164), bus adapter (158), and the front side bus (162), which is also a high-speed bus.

The example voice server (151) of FIG. 6 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for embodiments of the present technology include modems for wired dial-up communications, Ethernet (IEEE 802.3) adapters for wired data communications network communications, and 802.11 adapters for wireless data communications network communications.

Figure 7:
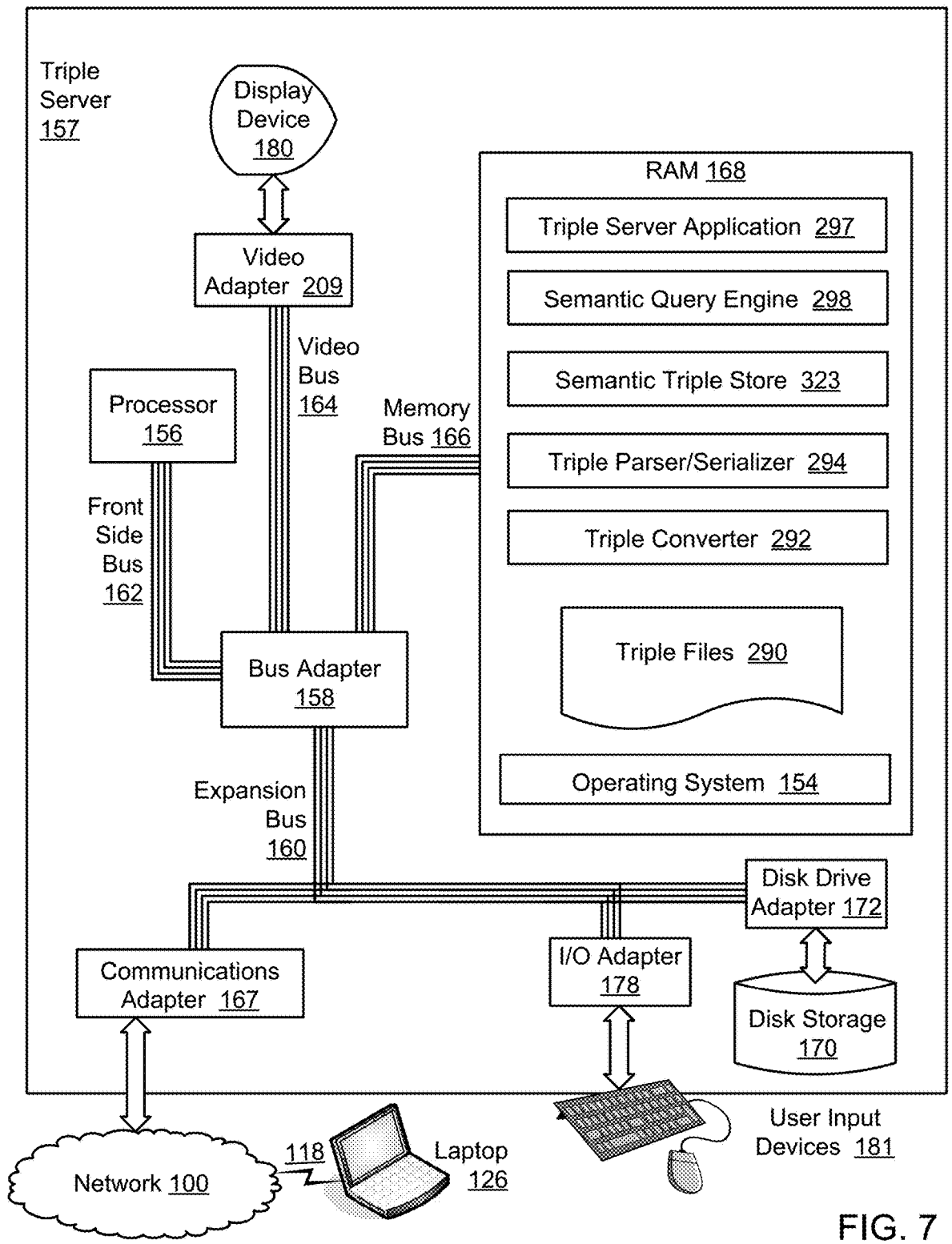
FIG. 7 sets forth a block diagram of automated computing machinery comprising an example of a computer useful as a triple server for mobile intelligent outside sales assistance according to embodiments of the present technology.

For further explanation, FIG. 7 sets forth a block diagram of automated computing machinery comprising an example of a computer useful as a triple server (157) for mobile intelligent outside sales assistance according to embodiments of the present technology. The triple server (157) of FIG. 7 includes at least one computer processor (156) or 'CPU' as well as random access memory (168) (RAM') which is connected through a high-speed memory bus (166) and bus adapter (158) to processor (156) and to other components of the triple server. The processor is connected through a video bus (164) to a video adapter (209) and a computer display (180). The processor is connected through an expansion bus (160) to a communications adapter (167), an I/O adapter (178), and a disk drive adapter (172). The processor is connected to a speech-enabled laptop (126) through data communications network (100) and wireless connection (118). Disposed in RAM is an operating system (154).

Also disposed in RAM are a triple server application program (297), a semantic query engine (298), a semantic triple store (814), a triple parser/serializer (294), a triple converter (292), and one or more triple files (290). The triple server application program (297) accepts, through network (100) from speech-enabled devices such as laptop (126), semantic queries that it passes to the semantic query engine (298) for execution against the triple stores (323, 325).

The triple parser/serializer (294) administers the transfer of triples between triple stores and various forms of disk storage. The triple parser/serializer (294) accepts as inputs the contents of triple stores and serializes them for output as triple files (290), tables, relational database records, spreadsheets, or the like, for long-term storage in non-volatile memory, such as, for example, a hard disk (170). The triple parser/serializer (294) accepts triple files (290) as inputs and outputs parsed triples into triple stores. In many embodiments, when the triple parser/serializer (294) accepts triple files (290) as inputs and outputs parsed triples into triple stores.

Figure 8:
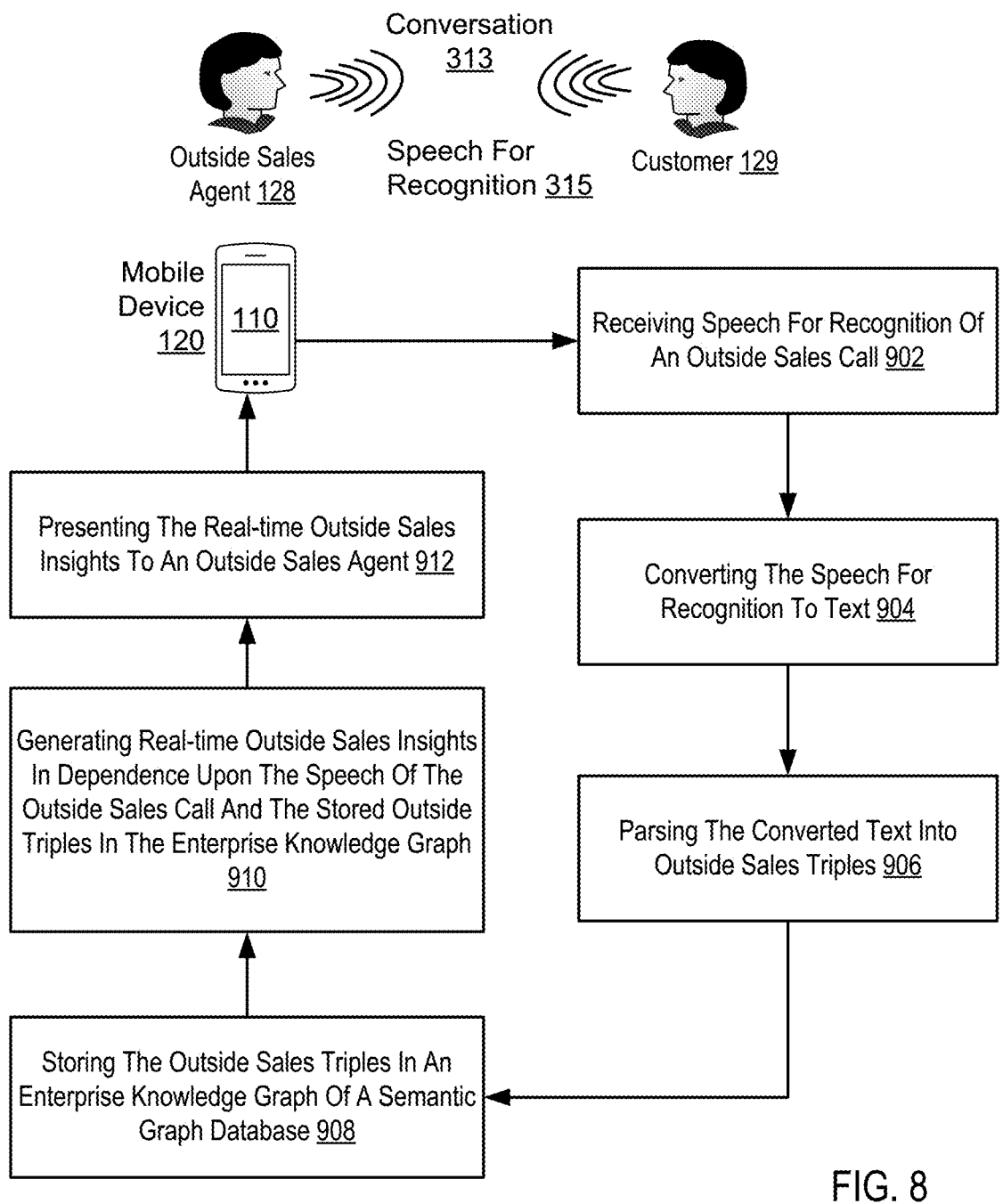
FIG. 8 sets forth a flow chart illustrating an example method of mobile intelligent outside sales assistance according to embodiments of the present technology.

For further explanation, FIG. 8 sets forth a flow chart illustrating an example method of mobile intelligent outside sales assistance according to embodiments of the present technology. The method of FIG. 8 includes receiving (902) speech for recognition of an outside sales call and converting (904) the speech for recognition to text. Converting (904) the speech for recognition to text may be carried out by invoking a speech engine as discussed above.

The method of FIG. 8 includes parsing (906) the converted text into outside sales triples and storing (908) the outside sales triples in an enterprise knowledge graph of a semantic graph database. As mentioned above, parsing (906) the converted text into outside sales triples and storing (908) the outside sales triples in an enterprise knowledge graph of a semantic graph database may be carried out by a triple parser and serializer in dependence upon a pre-defined taxonomy and ontology.

The method of FIG. 8 includes generating (910) real-time outside sales insights in dependence upon the speech of the outside sales call and the stored outside triples in the enterprise knowledge graph. Generating (910) real-time outside sales insights in dependence upon the speech of the outside sales call and the stored outside triples in the enterprise knowledge graph may be carried out by querying an enterprise knowledge graph of a semantic graph database.

The method of FIG. 8 includes presenting (912) the real-time outside sales insights to an outside sales agent. Presenting the real-time outside sales insights to an outside sales agent may be carried out by displaying the insights on a mobile device, sending a message to the agent, invoking a speech engine to play a message including the insight and in other ways as will occur to those of skill in the art.

It will be understood from the foregoing description that modifications and changes may be made in various embodiments of the present technology without departing from its true spirit. The descriptions in this specification are for purposes of illustration only and are not to be construed in a limiting sense. The scope of the present technology is limited only by the language of the following claims.

What is claimed is:

1. A system, comprising:
a non-transitory memory device storing machine-readable instructions; and
one or more processing devices operably coupled to the non-transitory memory device, the one or more processing devices configured to, upon execution of the machine-readable instructions, perform operations comprising:
receiving, by a speech-enabled device of the system, speech for recognition associated with an outside sales call, wherein the speech for recognition includes speech of a plurality of persons including a specific person, wherein the speech for recognition comprises one or more of:
speech from the specific person obtained through a microphone on a headset, or
speech that responds to a prompt executing on the speech-enabled device,
digitizing, by an audio amplifier and a coder of the system, the speech for recognition,
packaging the digitized speech in recognition request messages according to a voice over internet protocol (VOIP),
transmitting the digitized speech for recognition to a voice server through a VOIP connection on a network, based on the recognition request messages,
operating the voice server to return converted text representing the speech for recognition, wherein the digitized speech is converted to the text by passing the digitized speech to an Automated Speech Recognition (ASR) engine that is configured to:
generate a speech feature vector (SFV) corresponding to each digitized word in the digitized speech by using frequency domain components of corresponding digitized word, wherein the SFV is defined by a subset of the frequency domain components,
infer phonemes for each digitized word in the digitized speech based on the corresponding SFV using a language-specific acoustic model, and
identify, using the inferred phonemes, a word in a lexicon, corresponding to each digitized word in the digitized speech,
parsing, using a triple parser, the converted text to identify outside sales triples, wherein parsing the converted text into the outside sales triples comprises applying a pre-defined outside sales taxonomy comprising sets of words with defined semantics and an ontology comprising descriptions of concepts and properties in a domain, relationships between the concepts, and constraints corresponding to use of the relationships, storing the outside sales triples in an enterprise knowledge graph of a semantic graph database, generating, based on the outside sales triples stored in the enterprise knowledge graph and in response to a query, real-time sales insights associated with the speech of the outside sales call, and presenting the real-time sales insights on a display device of an agent associated with the outside sales call.

2. The system of claim 1 wherein generating the real-time sales insights further comprises generating the real-time sales insights in further dependence upon inside sales triples.

3. The system of claim 1, wherein at least a subset of the one or more processing devices is disposed within a mobile device.

4. The system of claim 1, wherein the one or more processing devices are configured to perform operations comprising:

obtaining industry information from at least one third party server, the industry information being related to an industry pertaining to a topic of the outside sales call;

parsing the obtained industry information to identify multiple semantic triples; and storing the semantic triples in the enterprise knowledge graph of the semantic graph database.

5. The system of claim 4, wherein the real-time sales insights are generated also on the semantic triples generated from the industry information.

6. The system of claim 1, wherein the one or more processing devices are configured to perform operations comprising:

determining that a description logic associated with the query supports deterministic identification of a result;

in response to determining that the description logic associated with the query supports the deterministic identification of the result, accessing a machine-processable deterministic data model supported by the description logic; and generating the real-time sales insights based at least in part on the machine-processable deterministic data model.

7. The system of claim 1, wherein the one or more processing devices are configured to perform operations comprising:

determining that a structure or semantics associated with the query supports a probabilistic identification of multiple results;

in response to determining that the structure or the semantics associated with the query supports the probabilistic identification of the multiple results, accessing a machine-processable probabilistic data model; and generating the real-time sales insights based at least in part on the machine-processable probabilistic data model.

8. A method, comprising:

receiving, by a speech-enabled device, speech for recognition associated with an outside sales call, wherein the speech for recognition includes speech of a plurality of persons including a specific person, wherein the speech for recognition comprises one or more of:

speech from the specific person obtained through a microphone on a headset, or speech that responds to a prompt executing on the speech-enabled device;

digitizing, by an audio amplifier and a coder, the speech for recognition;

packaging the digitized speech in recognition request messages according to a voice over internet protocol (VOIP);

transmitting the digitized speech for recognition to a voice server through a VOIP connection on a network, based on the recognition request messages;

operating the voice server to return converted text representing the speech for recognition, wherein the digitized speech is converted to the text by passing the digitized speech to an Automated Speech Recognition (ASR) engine that is configured to:

generate a speech feature vector (SFV) corresponding to each digitized word in the digitized speech by using frequency domain components of corresponding digitized word, wherein the SFV is defined by a subset of the frequency domain components, infer phonemes for each digitized word in the digitized speech based on the corresponding SFV using a language-specific acoustic model, and identify, using the inferred phonemes, a word in a lexicon, corresponding to each digitized word in the digitized speech;

parsing, using a triple parser, the converted text to identify outside sales triples, wherein parsing the converted text into the outside sales triples comprises applying a pre-defined outside sales taxonomy comprising sets of words with defined semantics and an ontology comprising descriptions of concepts and properties in a domain, relationships between the concepts, and constraints corresponding to use of the relationships;

storing the outside sales triples in an enterprise knowledge graph of a semantic graph database;

generating, based on the outside sales triples stored in the enterprise knowledge graph and in response to a query, real-time sales insights associated with the speech of the outside sales call; and presenting the real-time sales insights on a display device of an agent associated with the outside sales call.

9. The method of claim 8, wherein generating the real-time sales insights further comprises generating the real-time sales insights in further dependence upon inside sales triples.

10. The method of claim 8, further comprising:

obtaining industry information from at least one third party server, the industry information being related to an industry pertaining to a topic of the outside sales call;

parsing the obtained industry information to identify multiple semantic triples; and storing the semantic triples in the enterprise knowledge graph of the semantic graph database.

11. The method of claim 10, wherein the real-time sales insights are generated also on the semantic triples generated from the industry information.

12. The method of claim 8, further comprising:

determining that a description logic associated with the query supports deterministic identification of a result;

in response to determining that the description logic associated with the query supports the deterministic identification of the result, accessing a machine-processable deterministic data model supported by the description logic; and generating the real-time sales insights based at least in part on the machine-processable deterministic data model.

13. The method of claim 8, further comprising:

determining that a structure or semantics associated with the query supports a probabilistic identification of multiple results;

in response to determining that the structure or the semantics associated with the query supports the probabilistic identification of the multiple results, accessing a machine-processable probabilistic data model; and generating the real-time sales insights based at least in part on the machine-processable probabilistic data model.

14. Non-transitory machine-readable storage devices storing machine-readable instructions, which upon execution cause one or more processing devices to perform operations comprising:

receiving, by a speech-enabled device, speech for recognition associated with an outside sales call, wherein the speech for recognition includes speech of a plurality of persons including a specific person, wherein the speech for recognition comprises one or more of:
  speech from the specific person obtained through a microphone on a headset, or
  speech that responds to a prompt executing on the speech-enabled device, digitizing, by an audio amplifier and a coder, the speech for recognition, packaging the digitized speech in recognition request messages according to a voice over internet protocol (VOIP), transmitting the digitized speech for recognition to a voice server through a VOIP connection on a network, based on the recognition request messages,
  operating the voice server to return converted text representing the speech for recognition, wherein the digitized speech is converted to the text by passing the digitized speech to an Automated Speech Recognition (ASR) engine that is configured to:
    generate a speech feature vector (SFV) corresponding to each digitized word in the digitized speech by using frequency domain components of corresponding digitized word, wherein the SFV is defined by a subset of the frequency domain components,
    infer phonemes for each digitized word in the digitized speech based on the corresponding SFV using a language-specific acoustic model, and
    identify, using the inferred phonemes, a word in a lexicon, corresponding to each digitized word in the digitized speech, parsing, using a triple parser, the converted text to identify outside sales triples, wherein parsing the converted text into the outside sales triples comprises applying a pre-defined outside sales taxonomy comprising sets of words with defined semantics and an ontology comprising descriptions of concepts and properties in a domain, relationships between the concepts, and constraints corresponding to use of the relationships, storing the outside sales triples in an enterprise knowledge graph of a semantic graph database, generating, based on the outside sales triples stored in the enterprise knowledge graph and in response to a query, real-time sales insights associated with the speech of the outside sales call, and presenting the real-time sales insights on a display device of an agent associated with the outside sales call.

15. The non-transitory machine-readable storage devices of claim 14, wherein the operations further comprise:

determining that a description logic associated with the query supports deterministic identification of a result;

in response to determining that the description logic associated with the query supports the deterministic identification of the result, accessing a machine-processable deterministic data model supported by the description logic; and generating the real-time sales insights based at least in part on the machine-processable deterministic data model.

16. The non-transitory machine-readable storage devices of claim 14, wherein the operations further comprise:

determining that a structure or semantics associated with the query supports a probabilistic identification of multiple results;

in response to determining that the structure or the semantics associated with the query supports the probabilistic identification of the multiple results, accessing a machine-processable probabilistic data model; and generating the real-time sales insights based at least in part on the machine-processable probabilistic data model.

* * * * *